(12) United States Patent
Gaberthüel et al.

(10) Patent No.: US 11,149,893 B2
(45) Date of Patent: Oct. 19, 2021

(54) PROCESS CONNECTION FOR CONNECTING A FLOW MEASURING DEVICE TO A PIPELINE, FIELD DEVICE FOR AUTOMATION TECHNOLOGY AND METHOD FOR FASTENING A FLOW RECTIFIER TO A PROCESS CONNECTION

(71) Applicant: Endress+Hauser Flowtec AG, Reinach (CH)

(72) Inventors: Stephan Gaberthüel, Oberwil (CH); Rainer Höcker, Waldshut (DE); Lars Neyerlin, Wahlen (CH); Hanno Schultheis, Hermrigen (CH)

(73) Assignee: Endress+Hauser Flowtec AG, Reinach (CH)

( * ) Notice: Subject to any disclaimer, the term of this patent is extended or adjusted under 35 U.S.C. 154(b) by 0 days.

(21) Appl. No.: 16/838,087

(22) Filed: Apr. 2, 2020

(65) Prior Publication Data
US 2020/0319002 A1 Oct. 8, 2020

(30) Foreign Application Priority Data
Apr. 2, 2019 (DE) ..................... 10 2019 108 551.9

(51) Int. Cl.
*F16L 55/027* (2006.01)
*G01F 1/684* (2006.01)
*G01F 1/42* (2006.01)
*F15D 1/02* (2006.01)

(52) U.S. Cl.
CPC .......... *F16L 55/02709* (2013.01); *G01F 1/42* (2013.01); *G01F 1/6842* (2013.01); *F15D 1/025* (2013.01)

(58) Field of Classification Search
CPC ...... F16L 55/02709; F15D 1/025; G01F 1/42; G01F 1/6842
See application file for complete search history.

(56) References Cited

U.S. PATENT DOCUMENTS

| | | | |
|---|---|---|---|
| 3,840,051 A | 10/1974 | Akashi et al. | |
| 5,253,517 A * | 10/1993 | Molin | G01F 1/6842 73/114.32 |
| 5,341,848 A | 8/1994 | Laws | |

(Continued)

FOREIGN PATENT DOCUMENTS

| | | |
|---|---|---|
| DE | 10162197 A1 | 7/2002 |
| DE | 102006046252 A1 | 4/2007 |

(Continued)

OTHER PUBLICATIONS

Mickan, B., Pereira, G., Wu, J., Dopheide, D., A New Concept of Flow Conditioner Under Test, Flow Measurement 2001—International Conference, 15 pp.

*Primary Examiner* — Ryan D Walsh
(74) *Attorney, Agent, or Firm* — Christopher R. Powers; Endress+Hauser (USA) Holding Inc.

(57) ABSTRACT

The present disclosure relates to a process connection for connecting a flow measuring device, to a pipeline, the process connection including a base body having an opening for conducting a medium and a flow rectifier, wherein the flow rectifier is inserted into a first recess of the base body and fixed in place by plastic deformation of an edge region of the base body surrounding the first recess, for example, by press fitting.

18 Claims, 3 Drawing Sheets

(56) References Cited

U.S. PATENT DOCUMENTS

| | | | |
|---|---|---|---|
| 5,529,093 A | 6/1996 | Gallagher et al. | |
| 5,918,279 A * | 6/1999 | Hecht | G01F 1/6842 |
| | | | 73/204.21 |
| 6,276,198 B1 * | 8/2001 | Hueftle | G01F 1/6842 |
| | | | 73/204.21 |
| 6,722,196 B2 * | 4/2004 | Lenzing | G01F 1/6842 |
| | | | 73/204.21 |
| 7,845,688 B2 | 12/2010 | Gallagher et al. | |

FOREIGN PATENT DOCUMENTS

| | | |
|---|---|---|
| DE | 102011079993 A1 | 1/2013 |
| EP | 0458998 B1 | 12/1991 |

* cited by examiner

PROCESS CONNECTION FOR CONNECTING A FLOW MEASURING DEVICE TO A PIPELINE, FIELD DEVICE FOR AUTOMATION TECHNOLOGY AND METHOD FOR FASTENING A FLOW RECTIFIER TO A PROCESS CONNECTION

CROSS-REFERENCE TO RELATED APPLICATION

The present application is related to and claims the priority benefit of German Patent Application No. 10 2019 108 551.9, filed on Apr. 2, 2019, the entire contents of which are incorporated herein by reference.

TECHNICAL FIELD

The present disclosure relates to a process connection for connecting a flow measuring device to a pipeline, to a field device for automation technology, and to a method for fastening a flow rectifier to a process connection.

BACKGROUND

Flow rectifiers have long been known for converting a given flow into a flow with a known flow profile. For example, they are known from U.S. Pat. Nos. 3,840,051, 5,341,848, DE 10 2006 046 252 A1 or U.S. Pat. No. 5,529,093. Known embodiments are also shown in the article "A new concept of flow conditioner under test" by B. Mickan, G. Pereira, J. Wu and D. Dopheide.

DE 10 2011 079 933 A1 discloses a flow rectifier in the form of a perforated plate with holes in concentric circular paths which become larger toward the center. Furthermore, the flow rectifier has four bores which are arranged on a further perforated circle and thus simplify fastening between two pipelines with end flanges.

To obtain a reproducible flow profile in the medium, the flow rectifier must be firmly connected to the measuring tube. This is usually achieved by means of a welding method. A disadvantage of this method is that it is exceedingly costly to implement a welding process in an automated manufacturing process. Furthermore, measuring tubes with small nominal widths and/or with a small wall thickness are particularly vulnerable to errors in welding processes since measuring tube deformations or welding seam defects, such as cracks or cavities, can arise particularly quickly.

SUMMARY

The object of the present disclosure is to provide a process connection with a flow rectifier which is fastened to the process connection by a simplified method.

The object is achieved by the process connection according to claim 1, the field device according to claim 7 and the method for fastening a flow rectifier to a process connection according to claim 8.

The process connection according to the present disclosure for connecting a flow measuring device, e.g., a thermal flow measuring device, to a pipeline comprises a base body with an opening for conducting a medium and a flow rectifier. The flow rectifier is inserted into a first recess of the base body and fixed in place, e.g., by press fitting, using plastic deformation of an edge region of the base body surrounding the first recess.

The base body may be rotationally symmetrical with respect to a rotational axis running through the center of the base body and comprises at least one opening, which is also referred to as a central bore and is circular, and optionally an attachment for welding to a measuring tube. The function of a process connection is to enable a non-destructive connection of the measuring tube to an existing pipeline. For this purpose, the base body has either fastening bores or a thread. Usually, the base body is preformed by forging from a steel blank or from a metal sheet and is subsequently manufactured by turning and drilling. In flow applications, a measuring tube may have two process connections, each of which is mounted at an end.

A flow rectifier or a flow conditioner may be a thin perforated or porous plate mounted perpendicularly to the flow direction of the medium or a bundle of tubes which is inserted into the measuring tube and whose longitudinal axis coincides with the flow direction of the medium in the measuring tube.

The base body has a front side into which a first recess is incorporated which has a diameter selected in such a way that the flow rectifier can be inserted into the first recess. According to an embodiment, the flow rectifier is connected in a form-locked manner to the base body on at least one side. The first recess has a center that substantially coincides with the center of the opening. The diameter of the first recess is always larger than the diameter of the opening. As a result, an annular surface is formed in the first recess. The flow rectifier rests on this annular surface. The first recess can be manufactured by means of a manufacturing method, such as turning, drilling or milling.

The flow rectifier is fixed in place in the first recess by plastic deformation of the base body. This means that the flow rectifier cannot fall out or be removed without plastic deformation of the base body or the flow rectifier. To this end, force is applied to the edge region surrounding the first recess to deform the edge region in such a way that the effective cross-sectional area of the first recess is reduced. In an orthogonal projection of a circumference of the flow rectifier and a circumference of the first recess in the direction of the flow direction, at least one overlap occurs between the circumference of the first recess and the circumference of the flow rectifier after the plastic deformation. The edge region partially covers the flow rectifier after the deformation. A part of the edge is thus formed as a projection. The flow rectifier is fixed in its position in this way. The flow rectifier is prevented from falling out of the first recess.

Press fitting denotes the production of a connection between two individual assemblies by plastic deformation, e.g., cold deformation of at least one assembly. For example, an edge region of an assembly is deformed in such a way that the two assemblies become wedged together. In this case, one assembly is the base body and the other assembly is the flow rectifier.

Advantageous developments of the present disclosure are specified in the dependent claims. All combinations of at least two of the features specified in the description, the claims and/or the figures also fall within the scope of the present disclosure.

According to one embodiment, the flow rectifier is configured as a perforated plate and has an edge, wherein the first recess has an inner side, wherein the plastic deformation creates a friction-locked connection between the edge of the flow rectifier and the inner side of the first recess.

Flow rectifiers are known per se in the flow area. Ideally, they should enable the formation of a fully developed and axially symmetrical flow profile when flow turbulence occurs due to pumps, projections or recesses on the inner wall of a pipe or of pipe transitions. This may require very long inlet lengths, which are usually 20 to 50·DN (nominal diameter). However, applications are known in which it is not possible to adhere to a minimum inlet length. Flow rectifiers, such as perforated plates, ensure that the axially symmetrical flow profile already develops earlier and that an inlet section can be eliminated, or the inlet section can be shortened. A perforated plate comprises a plate which may be configured as a round disk and provided with holes. In an embodiment, the perforated plate has holes with at least three different sizes of hole diameters. One hole is located in the center, while the other holes are distributed in concentric circles of holes. During operation, a medium flows toward the perforated plate and penetrates through the holes.

A friction-locked connection between the edge of the flow rectifier and the inner side of the first recess prevents them from displacing each other. Between the connected surfaces effectively acts a force which must be overcome for the flow rectifier to be rotated and/or moved in the direction of flow. A bonded connection between the flow rectifier and the base body is especially eliminated.

According to one embodiment, the plastic deformation wedges the inner side of the first recess together with the edge of the flow rectifier.

The press fitting deforms the region surrounding the first recess and a portion of the material pushes over the flow rectifier. It is particularly advantageous if plastic deformation of the flow rectifier also occurs during press fitting. The force which acts on the base body during press fitting is converted into deformation force, which leads to plastic cold deformation of the edge region surrounding the first recess. If the inner side of the first recess abuts the edge of the flow rectifier and the edge is fixed in place, the deformation force is transferred to the flow rectifier and plastic deformation of the flow rectifier additionally occurs. The base body partially cuts into the flow rectifier and the two assemblies become wedged together. The wedging prevents the flow rectifier from rotating about the axis of rotation of the flange.

According to one embodiment, the base body comprises a flange or a threaded nipple. There are different flange types that are adapted to the different conditions of application. They are, for example, welded or screwed onto the measuring tube. Weld neck flanges have a protrusion for welding to the measuring tube. Instead of a protrusion for welding, threaded flanges have an internal thread into which the measuring tube or the threaded nipple is screwed. Instead of a flange, threaded nipples are also used and are fastened on one side to the measuring tube, for example, by welding. This enables the measuring tube to be connected to a threaded tube.

According to one embodiment, the first recess has a depth t, wherein the flow rectifier has a thickness d, wherein the depth t is at most 5 millimeters, alternatively, at most 2 millimeters, and further at most 1 millimeter larger than the thickness d.

It is particularly advantageous if the depth t of the first recess is always larger than the thickness d of the flow rectifier. It has however been found to be advantageous if the difference between the depth t and the thickness d is less than 1 millimeter. This makes it possible to ensure that the plastic deformation of the edge region also results in wedging between the flow rectifier and the base body.

According to one embodiment, the first recess is partially conical, with a cone angle of $45° \leq \phi \leq 150°$, alternatively, $60° \leq \phi \leq 120°$, and further $80° \leq \phi \leq 100°$.

The field device according to the present disclosure for automation technology comprises a measuring tube, a process connection according to the present disclosure, wherein the process connection is fastened to the measuring tube, a measuring sensor comprising at least one, e.g., thermal sensor and a measuring transducer for determining a volume and/or mass flow.

The method according to the present disclosure for fastening a flow rectifier to a process connection according to the present disclosure includes the flow rectifier having an edge is inserted, e.g., in a form-locked manner, into a first recess of the process connection having an inner side, and that the fastening of the flow rectifier to the process connection then takes place by plastic deformation, e.g., by anchoring and/or by wedging together of the edge with the inner side and/or by press fitting of material of the edge region surrounding the first recess, so that a friction-locked and/or form-locked connection is formed between the edge and the inner side.

According to one embodiment, the press fitting is achieved by incorporating at least one second recess into the edge region surrounding the first recess.

According to one embodiment, the second recess is formed as a hole, e.g., a blind hole, notch or gap.

BRIEF DESCRIPTION OF THE DRAWINGS

The present disclosure is explained in greater detail with reference to the following figures in which.

DETAILED DESCRIPTION

Flow rectifiers in the form of perforated plates are known per se. Ideally, they should enable the formation of a fully developed and axially symmetrical flow profile. Very long inlet lengths are usually required for this purpose. Nevertheless, flow turbulence can occur due to pumps, projections or recesses on the inner wall of a pipe or pipe transitions.

Figure 1:
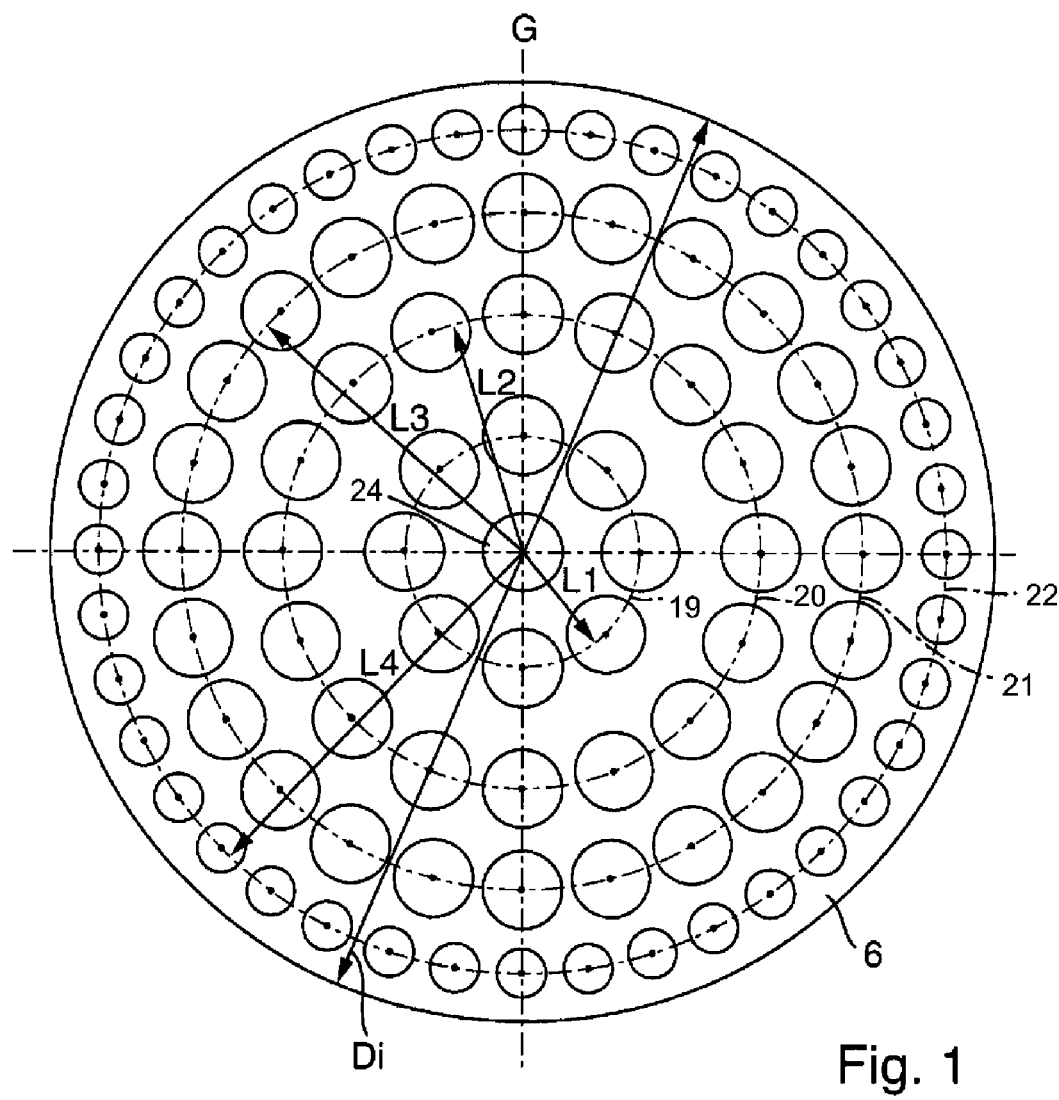
FIG. 1 shows a flow rectifier according to the prior art.

As shown in FIG. 1, a conventional flow rectifier 6 has holes arranged in concentric circular paths 19, 20, 21 and 22 around a central hole 24, which central hole 24 is arranged in the center of the flow rectifier.

A corresponding circular path 19-22 preferably only has holes with a uniform hole diameter. There are preferably no holes outside the concentric circular paths.

The holes of the respective circular paths are preferably of round design. Likewise preferably, they have hole centers, wherein the hole centers of two of the holes on a circular path are in each case arranged in a straight line G which is perpendicular to the surface normal of the flow rectifier 6.

The flow rectifier 6 has a cylindrical basic shape with a preferably circular cylinder base surface and a transverse axis, and a lateral surface coaxial with the transverse axis.

The flow rectifier may be used in a flow measuring device.

The perforated plate shown in FIG. 1 comprises a total of 89 holes.

The central hole 24 is arranged in the center of the flow rectifier 6. The flow rectifier has an overall diameter Di. Starting from the central hole 24, a first circular path 19 is arranged after the length L1 in the radial direction, on which circular path 19 a total of 8 holes are arranged symmetrically around the central hole 24.

Starting from the first circular path 19, a second circular path 20 with a radius L2 is arranged in the radial direction, on which second circular path 20 a total of 16 holes are arranged symmetrically around the central hole 24. The holes of the second circular path 20 can be designed to be larger than the holes in the first circular path 19.

Starting from the second circular path 20, a third circular path 21 with a radius L3 is arranged in the radial direction, on which third circular path 21 a total of 24 holes are arranged symmetrically around the central hole 24. The holes of the third circular path 21 can be designed to be smaller than the holes of the second circular path 20 and particularly also smaller than the holes of the first circular path 19.

Starting from the third circular path 21, a fourth circular path 22 with a radius L4 is arranged in the radial direction, on which fourth circular path 22 a total of 40 holes are arranged symmetrically around the central hole 24. The holes of the fourth circular path 22 can be designed to be smaller than the holes of the other circular paths 19, 20, 21 and the central hole 24.

Most preferably, the holes are arranged on the flow rectifier 6 in such a way that, when rotated by an angle around the axis of rotation, the flow rectifier can be made to be congruent with itself. This angle is preferably in a range between 30-60°, e.g., 45°.

The thickness of the flow rectifier may be between 10 and 15% of the length of the diameter of the perforated plate, particularly between 0.11-0.13 Di, e.g., 0.12 Di.

Figure 2:
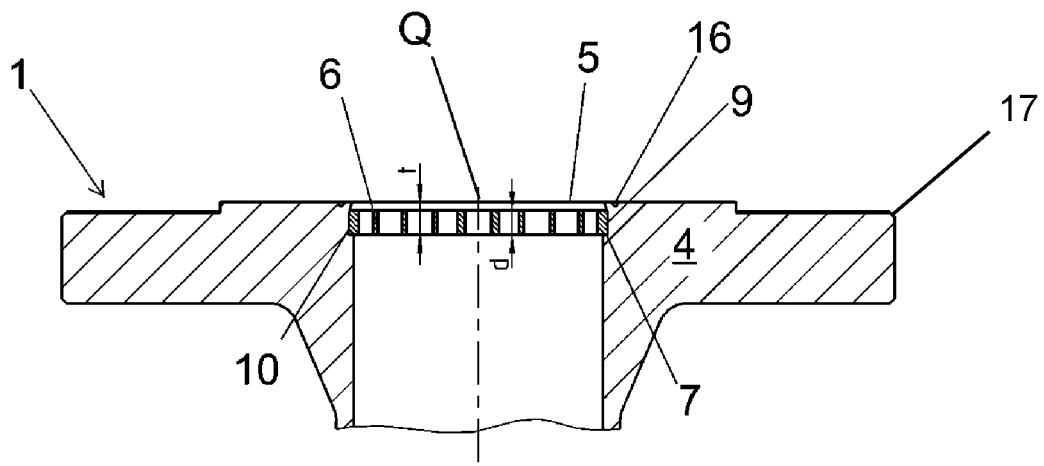
FIG. 2 shows a longitudinal section through an exemplary embodiment of a process connection according to the present disclosure.

FIG. 2 shows a partial cross-section of a process connection 1, including a flange 17 with flow rectifier 6. The process connection 1 consists of a base body 4 in which an opening 5 is incorporated. According to the present disclosure, a first recess 7 having a depth t is incorporated into the base body 4, into which recess a flow rectifier 6 with thickness d is inserted.

In this embodiment, the opening 5 and the first recess 7 have a common center point which lies on the longitudinal axis of a measuring tube. The transverse axis Q of the flow rectifier thus coincides with the longitudinal axis of the measuring tube. The diameter of the first recess 7 is larger than the diameter of the flow rectifier 6. The thickness d is less than the depth t. The edge 9 of the flow rectifier 6 is at least partially in direct contact with the inner side 10 of the first recess 7. Also seen are two recesses 16 and a plastic deformation of the edge region, which ensures that material of the base body 4 extends over the front side of the flow rectifier 6 and forms a projection.

Figure 3:
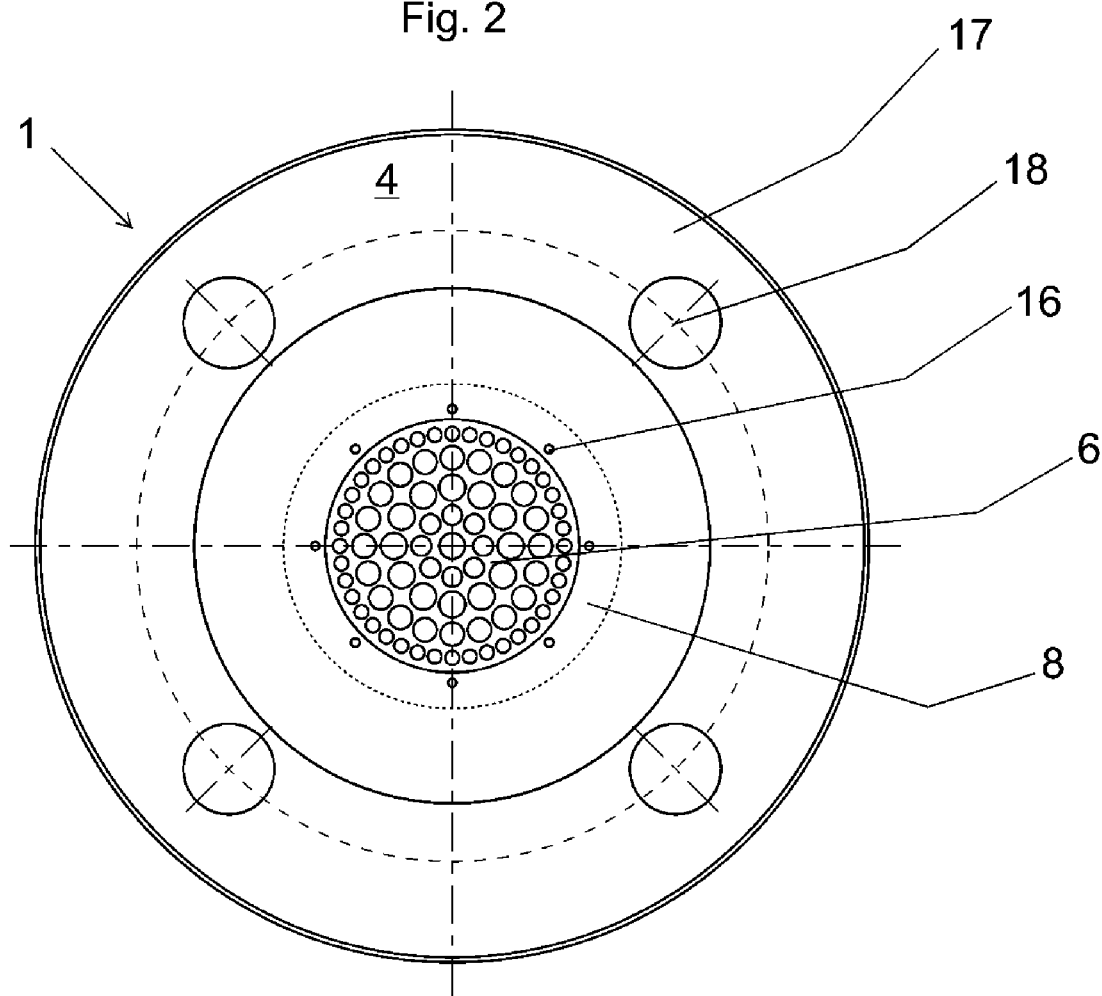
FIG. 3 shows a front view of an exemplary embodiment of a process connection according to the present disclosure.

FIG. 3 shows a plan view of an embodiment of the process connection 1 according to the present disclosure. The flow rectifier 6 is inserted into the first recess of the base body 4. The base body 4 is designed as a flange 17 and has four screw holes 18. Eight second recesses 16 which ensure that the flow rectifier 6 is fixed in the first recess are incorporated into an edge region 8 surrounding the first recess. The edge region 8 is indicated by a dashed circle.

Figure 4:
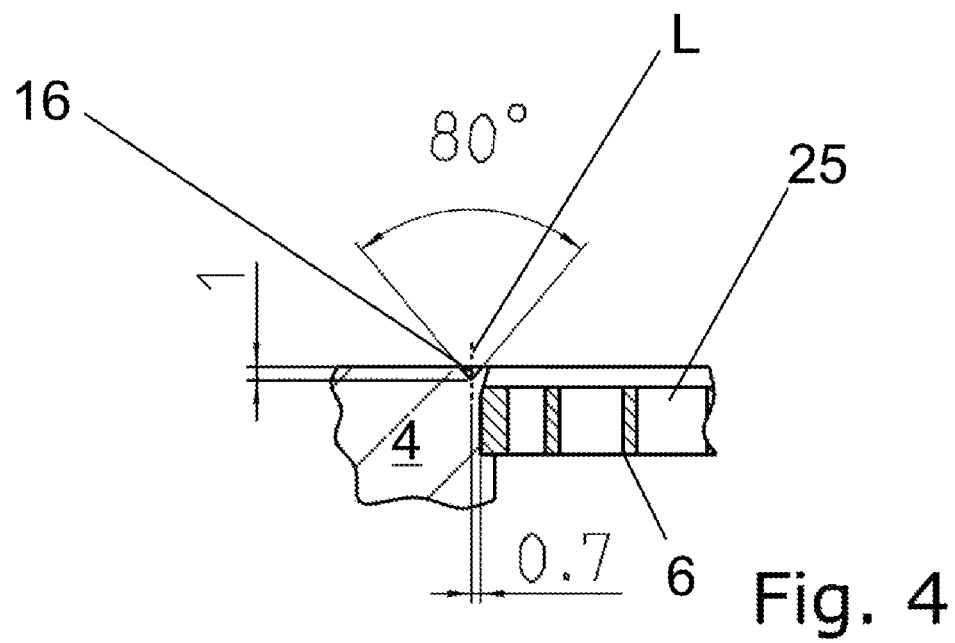
FIG. 4 shows a detail view of a partial cross-section of an exemplary embodiment of a process connection according to the present disclosure.

FIG. 4 shows a detail view of a partial cross-section of the base body 4 and flow rectifier 6. In such an embodiment, not only does material of the base body 4 push over the front side of the flow rectifier 6 and form a projection, but the plastic deformation of the base body 4 is also accompanied by plastic deformation of the flow rectifier 6. The plastic deformation of the two assemblies is brought about by introducing at least one second recess 16 into an edge region surrounding the first recess. This leads to wedging of the base body 4 together with the flow rectifier 6. The force which acts on the base body 4 during press fitting is converted into deformation force, which leads to plastic cold deformation of the edge region 8 surrounding the first recess 7. When the inner side 10 of the first recess 7 abuts the edge 9 of the flow rectifier 6 and the edge 9 is fixed in place, the deformation force is transferred to the flow rectifier 6 and plastic deformation thereof additionally occurs. The base body 4 partially cuts into the flow rectifier 6 and the two assemblies become wedged together.

In the embodiment of FIG. 4, the second recess 16 is conical or has a partially triangular cross-sectional area and has a cone angle of 80°. Furthermore, the second recess 16 has a longitudinal axis L which runs in parallel to the transverse axis of the flow rectifier. In the depicted embodiment, the longitudinal axis of the second recess 16 is a distance of 0.7 millimeters (mm) from the edge 9 of the flow rectifier. The second recess 16 has a depth of 1 mm. However, the process connection 1 according to the present disclosure may also include second recesses 16 which are blind holes, notches or gaps and which have a longitudinal axis which does not run in parallel to the transverse axis of the flow rectifier. Furthermore, the second recess 16 can also be cylindrical or can at least have a partially triangular, quadrangular, square or rounded cross-sectional area.

Figure 5:
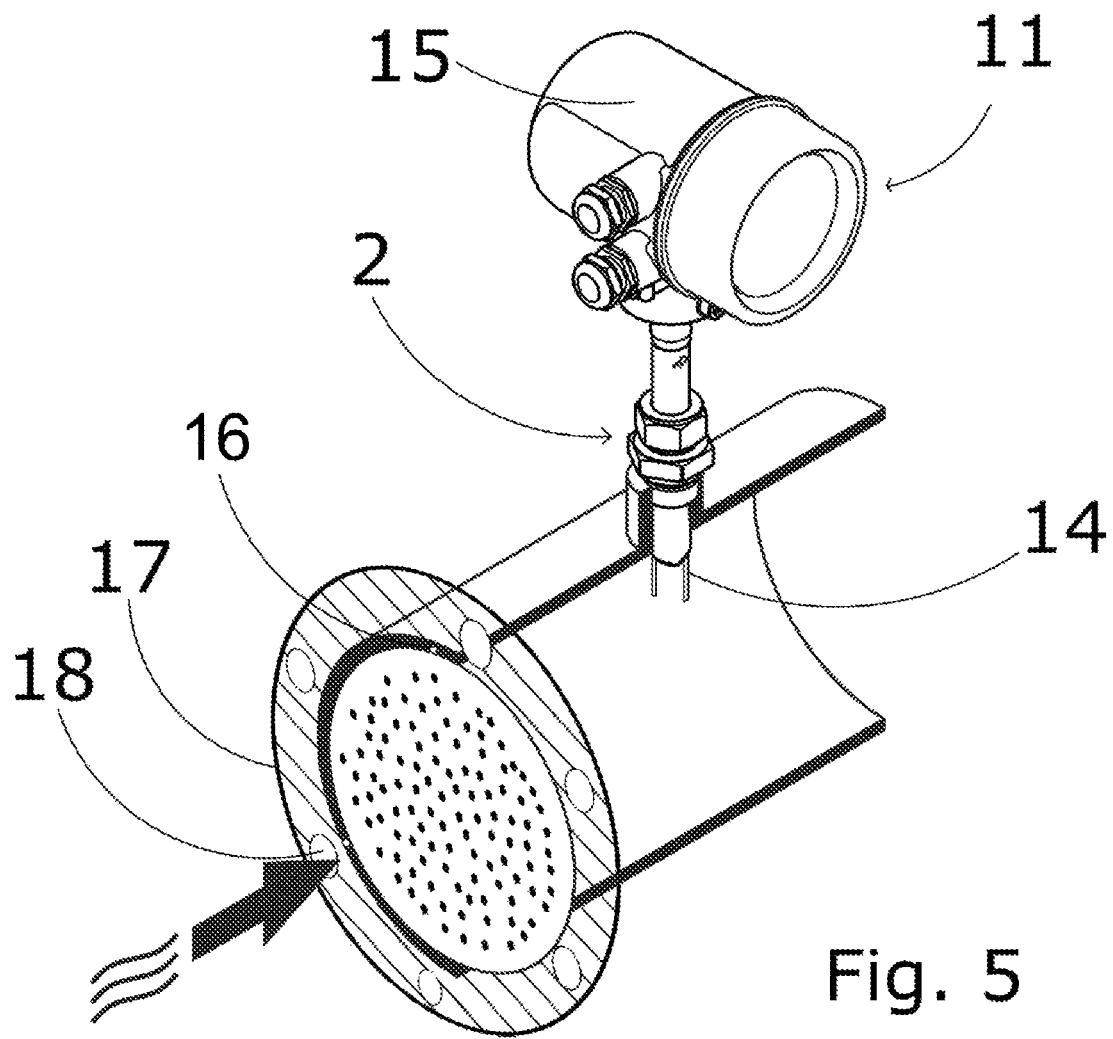
FIG. 5 shows a thermal flow measuring device having a process connection according to the present disclosure.

FIG. 5 shows a thermal flow measuring device 2 with an inserted flow rectifier 6 according to the present disclosure, a measuring sensor 13, a measuring transducer 15 and two thermal sensors 14. The flow rectifier 6 is inserted into a process connection, for example, upstream of a flow measuring device, for example, a flow measuring device as found in industrial process measurement technology, for example, a thermal flow measuring device 2. This implementation for the present disclosure is useful, for example, for reducing a so-called inlet length in front of the flow measuring device 2, e.g., after a bend in the pipeline, i.e., downstream of a bend in the pipeline. The length of the distance parallel to the main flow direction of the fluid in the pipeline, usually along the pipeline longitudinal axis, between the flow rectifier 6 and the flow measuring device 2 is then, for example, less than 4·DN. The similarly measured length of the distance between the end of the pipe bend and the flow rectifier 6 is, for example, less than 5·DN. Flow rectifiers according to the present disclosure are particularly suitable for flows in the laminar, transient and turbulent region, especially, for gases. In order to fix the flow rectifier 6 in the process connection sufficiently well, the method according to the present disclosure is used. For this purpose, second recesses 16 are incorporated into the base body, for example, into the flange 17, in the immediate vicinity of the first recess. This is ideally done with the aid of a press fitting tool. The thermal flow measuring device can be attached to an existing pipeline by means of screw holes 18.

The invention claimed is:

1. A process connection for connecting a flow measuring device to a pipeline, the process connection comprising:
   a metal base body including an opening for conducting a medium, the opening including a first recess; and
   a flow rectifier, wherein the flow rectifier is disposed in the first recess of the base body and fixed in place by one or more projections of an edge region of the base body surrounding the first recess formed by plastic deformation of the edge region, wherein the one or more projections further plastically deform an adjacent edge of the flow rectifier such that the flow rectifier is fixed in place in a friction-locked or form-locked manner.

2. The process connection of claim 1, wherein:
the flow rectifier is configured as a perforated plate having an edge;
the first recess has an inner side; and
the friction-locked connection is formed between the adjacent edge of the flow rectifier and the inner side of the first recess by the plastic deformation.

3. The process connection of claim 2, wherein the inner side of the first recess is wedged together with the adjacent edge of the flow rectifier by the plastic deformation.

4. The process connection of claim 1, wherein the base body includes a flange or a threaded nipple.

5. The process connection of claim 1, wherein:
the first recess has a depth;
the flow rectifier has a thickness; and
the depth is at most 5 millimeters (mm) larger than the thickness.

6. The process connection of claim 5, wherein the depth is at most 2 mm larger than the thickness.

7. The process connection of claim 5, wherein the depth is at most 1 mm larger than the thickness.

8. The process connection of claim 1, wherein the first recess is at least partially conical with a cone angle of greater than or equal to 45° and less than or equal to 150°.

9. The process connection of claim 8, wherein the first recess is at least partially conical with a cone angle of greater than or equal to 60° and less than or equal to 120°.

10. The process connection of claim 8, wherein the first recess is at least partially conical with a cone angle of greater than or equal to 80° and less than or equal to 100°.

11. The process connection of claim 1, wherein the base body includes at least one second recess in the edge region of the base body surrounding the first recess, the at least one second recess configured to facilitate the forming of the one or more projections of the edge region of the base body by plastic deformation of the edge region.

12. The process connection of claim 11, wherein the second recess is a blind hole, notch or gap.

13. The process connection of claim 1, wherein the flow rectifier is fixed in place by press fitting.

14. The process connection of claim 1, wherein the flow measuring device is a thermal flow measuring device.

15. A field device for automation technology, the field device comprising:
a measuring tube;
a process connection according to claim 1, wherein the process connection is fastened to the measuring tube;
a measuring sensor including at least one thermal sensor; and
a measuring transducer configured to determine a volume flow and/or a mass flow.

16. A method for fastening a flow rectifier to a process connection, the method comprising:
providing a process connection including a metal base body including an opening for conducting a medium, the opening including a first recess having an inner side, wherein the base body further includes an edge region surrounding the first recess;
providing a flow rectifier having an edge;
inserting the flow rectifier into the first recess of the process connection; and
fastening the flow rectifier to the process connection by plastic deformation of the edge region surrounding the first recess and of the flow rectifier by anchoring and/or by wedging together the edge of the flow rectifier and the inner side of the first recess and/or by press fitting of material of the edge region surrounding the first recess such that a form-locked and/or friction-locked connection is formed between the edge of the flow rectifier and the inner side of the first recess.

17. The method of claim 16, wherein the fastening is facilitated by at least one second recess disposed in the edge region surrounding the first recess.

18. The method of claim 17, wherein the at least one second recess is a blind hole, notch or gap.

* * * * *